US010369875B2

(12) United States Patent
Yanagida et al.

(10) Patent No.: US 10,369,875 B2
(45) Date of Patent: Aug. 6, 2019

(54) TORQUE ROD

(71) Applicant: BRIDGESTONE CORPORATION, Tokyo (JP)

(72) Inventors: Motohiro Yanagida, Tokyo (JP); Akira Ueki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/768,858

(22) PCT Filed: Sep. 9, 2016

(86) PCT No.: PCT/JP2016/076582
§ 371 (c)(1),
(2) Date: Apr. 17, 2018

(87) PCT Pub. No.: WO2017/073180
PCT Pub. Date: May 4, 2017

(65) Prior Publication Data
US 2019/0054811 A1 Feb. 21, 2019

(30) Foreign Application Priority Data
Oct. 28, 2015 (JP) .................................. 2015-211895

(51) Int. Cl.
*B60K 5/12* (2006.01)
*F16F 15/02* (2006.01)
(Continued)

(52) U.S. Cl.
CPC .............. *B60K 5/1208* (2013.01); *B60K 5/12* (2013.01); *F16F 1/3849* (2013.01);
(Continued)

(58) Field of Classification Search
CPC ....... B60K 5/1208; B60K 5/12; F16F 1/3849; F16F 15/03; F16F 15/08; F16F 15/022; F16F 2230/30
See application file for complete search history.

(56) References Cited

U.S. PATENT DOCUMENTS 9,308,806 B2 * 4/2016 Inoue ..................... F16F 7/1011
9,611,916 B2 * 4/2017 Shimada ............... F16F 1/3849
(Continued)

FOREIGN PATENT DOCUMENTS

CN 1845833 A 10/2006
CN 102900804 A 1/2013
(Continued)

OTHER PUBLICATIONS

International Search Report of PCT/JP2016/076582 filed Nov. 22, 2016.
(Continued)

*Primary Examiner* — Anita M King
(74) *Attorney, Agent, or Firm* — Sughrue Mion, PLLC

(57) ABSTRACT

There is provided a torque rod (1) in which any one of a partition wall (27) between an interior of a first accommodation portion (15) for accommodating a first elastic bush (11) and an interior of a third accommodation portion (17) for accommodating an actuator (14) and a partition wall (28) between an interior of a second accommodation portion (16) for accommodating a second elastic bush (12) and the interior of the third accommodation portion (17) has a communication hole (29) for allowing the interiors of both the accommodation portions to communicate with each other, and a whole area of the other partition wall is closed. In the communication hole (29), a counterbore (29a) is formed in an end portion on a side opposite to the third accommodation portion (17). The torque rod includes a bolt (30) that is inserted into the communication hole (29), and
(Continued)

that has a head portion (30*a*) accommodated in the counterbore (29*a*). The bolt (30) is screwed into a support shaft (24) or the communication hole (29) so that the head portion (30*a*) is pressed against an annular flat surface (29*c*) which faces a side opposite to the third accommodation portion (17) on an inner surface of the counterbore (29*a*), and the support shaft (24) is pressed against the partition wall (28).

16 Claims, 2 Drawing Sheets

(51) Int. Cl.
  *F16F 15/03* (2006.01)
  *F16F 1/38* (2006.01)
  *F16F 15/08* (2006.01)
(52) U.S. Cl.
  CPC ............ *F16F 15/022* (2013.01); *F16F 15/03* (2013.01); *F16F 15/08* (2013.01); *F16F 2230/30* (2013.01)

(56) References Cited

U.S. PATENT DOCUMENTS

| | | | |
|---|---|---|---|
| 2005/0254888 A1* | 11/2005 | Oji | F16F 1/3849 403/187 |
| 2007/0018367 A1 | 1/2007 | Kamei | |
| 2007/0272051 A1* | 11/2007 | Kamei | B60G 7/001 74/579 R |
| 2008/0315473 A1* | 12/2008 | Nishimae | F16F 1/3849 267/140.11 |
| 2013/0328254 A1 | 12/2013 | Kojima et al. | |
| 2014/0151946 A1* | 6/2014 | Yokawa | F16F 1/3849 267/292 |
| 2016/0176279 A1* | 6/2016 | Inatomi | F16F 1/3849 248/638 |
| 2016/0193907 A1* | 7/2016 | Satou | F16F 1/3849 267/140.4 |

FOREIGN PATENT DOCUMENTS

| | | |
|---|---|---|
| CN | 103180633 A | 6/2013 |
| CN | 104903614 A | 9/2015 |
| EP | 2 610 522 A1 | 7/2013 |
| JP | 2012-42021 A | 3/2012 |
| JP | 2012-042023 A | 3/2012 |
| JP | 2012-516270 A | 7/2012 |
| JP | 2012255459 A | 12/2012 |
| JP | 2013179750 A | 9/2013 |
| JP | 2014-059019 A | 4/2014 |
| JP | 2015-148243 A | 8/2015 |
| WO | 2010/088471 A1 | 8/2010 |

OTHER PUBLICATIONS

Communication dated Oct. 15, 2018 from the European Patent Office in counterpart application No. 16859417.4.
Communication dated Mar. 8, 2019 by the Intellectual Property Office of the P.R. of China in application No. 201680061952.1.

* cited by examiner

TORQUE ROD

CROSS REFERENCE TO RELATED APPLICATIONS

This application is a National Stage of International Application No. PCT/JP2016/076582 filed Sep. 9, 2016, claiming priority based on Japanese Patent Application No. 2015-211895 filed Oct. 28, 2015.

TECHNICAL FIELD

The present invention relates to a torque rod.

BACKGROUND ART

In the related art, for example, a torque rod as disclosed in Patent Document 1 is known. That is, the torque rod in the related art includes a first elastic bush connected to a vibration generator, a second elastic bush connected to a vibration receiver, and an actuator installed between the first elastic bush and the second elastic bush. The actuator attenuates and absorbs an input vibration by causing a cylindrical movable element to reciprocate so as to move close to or move away from the first elastic bush and the second elastic bush in response to the input vibration. The torque rod in the related art further includes a case body including a first accommodation portion whose interior accommodates the first elastic bush, a second accommodation portion whose interior accommodates the second elastic bush, and a third accommodation portion which is installed between the first accommodation portion and the second accommodation portion and whose interior accommodates the actuator. Furthermore, according to the torque rod in the related art, inside the movable element, the actuator includes a support shaft extending along a reciprocating direction of the movable element.

CITATION LIST

Patent Document

[Patent Document 1] Japanese Unexamined Patent Application, First Publication No. 2012-42023

SUMMARY OF INVENTION

Technical Problem

However, according to the torque rod in the related art, there is room for improvement in firmly fixing the support shaft of the actuator into the third accommodation portion and in ensuring liquid-tightness inside the third accommodation portion.

This invention is made in view of these circumstances, and an object thereof is to provide a torque rod capable of firmly fixing a support shaft of an actuator to an interior of a third accommodation portion and capable of easily and reliably ensuring liquid-tightness inside the third accommodation portion.

Solution to Problem

According to a first aspect of the present invention, there is provided a torque rod including a first elastic bush that is connected to a vibration generator, a second elastic bush that is connected to a vibration receiver, an actuator that is installed between the first elastic bush and the second elastic bush, and that is configured to attenuate and absorb an input vibration by causing a cylindrical movable element to reciprocate so as to move close to or move away from the first elastic bush and the second elastic bush in response to the input vibration, and a case body that includes a first accommodation portion inside which the first elastic bush is accommodated, a second accommodation portion inside which the second elastic bush is accommodated, and a third accommodation portion which is installed between the first accommodation portion and the second accommodation portion and inside which the actuator is accommodated. The actuator includes a support shaft extending along a reciprocating direction of the movable element inside the movable element. In the case body, any one of a partition wall between an interior of the first accommodation portion and an interior of the third accommodation portion and a partition wall between an interior of the second accommodation portion and the interior of the third accommodation portion has a communication hole for allowing the interiors of both the accommodation portions to communicate with each other, and a whole area of the other partition wall is closed. In the communication hole, a counterbore is formed in an end portion on a side opposite to the third accommodation portion. The torque rod includes a bolt that is inserted into the communication hole, and that has a head portion accommodated in the counterbore. The bolt is screwed into the support shaft or the communication hole so that the head portion is pressed against an annular flat surface which faces a side opposite to the third accommodation portion on an inner surface of the counterbore, and the support shaft is pressed against the partition wall.

Advantageous Effects of Invention

According to this invention, it is possible to firmly fix a support shaft of an actuator to an interior of a third accommodation portion, and it is possible to easily and reliably ensure liquid-tightness inside the third accommodation portion.

DESCRIPTION OF EMBODIMENTS

Figure 1:
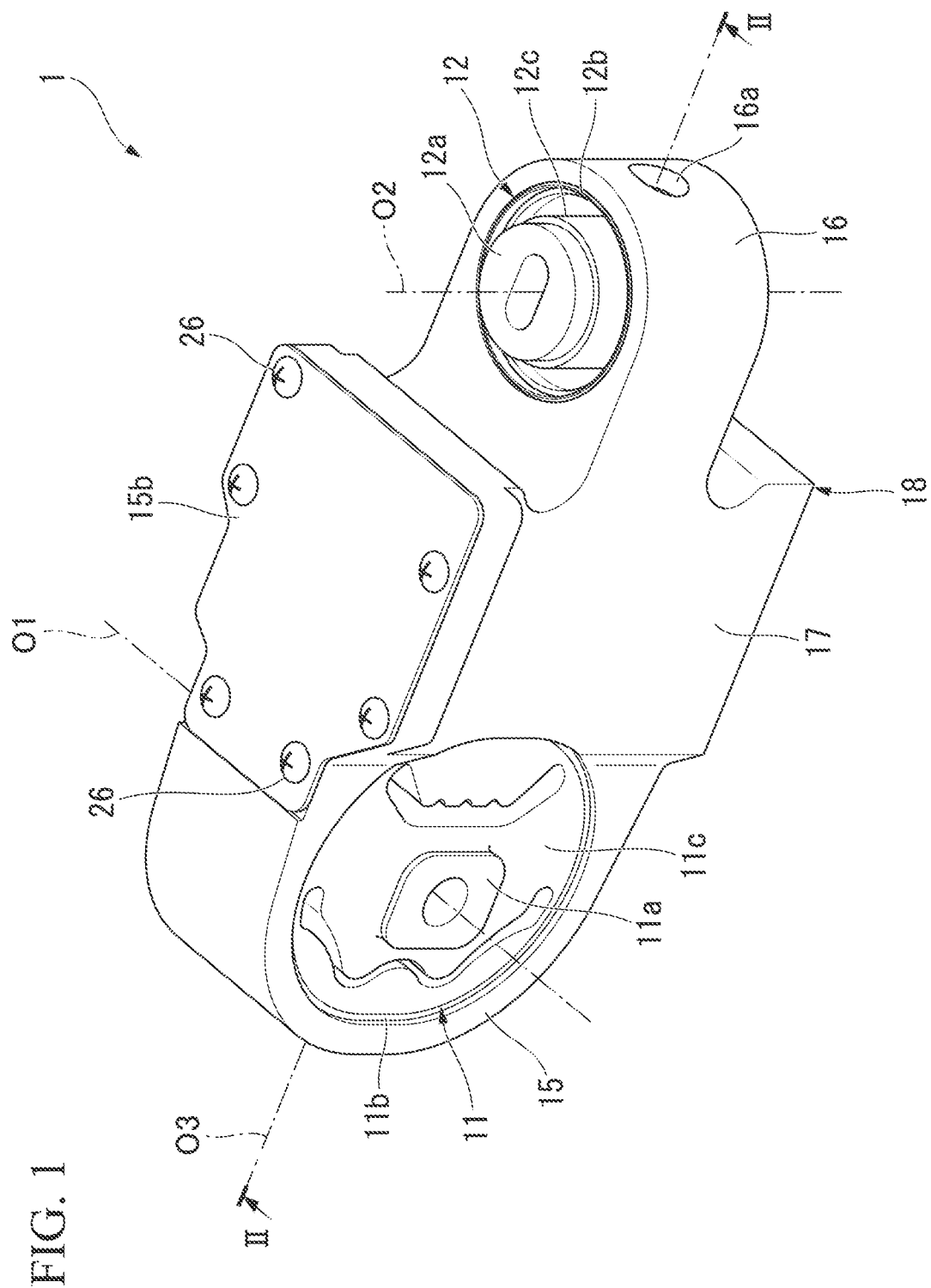
FIG. 1 is a perspective view of a torque rod shown as an embodiment according to the present invention.
Figure 2:
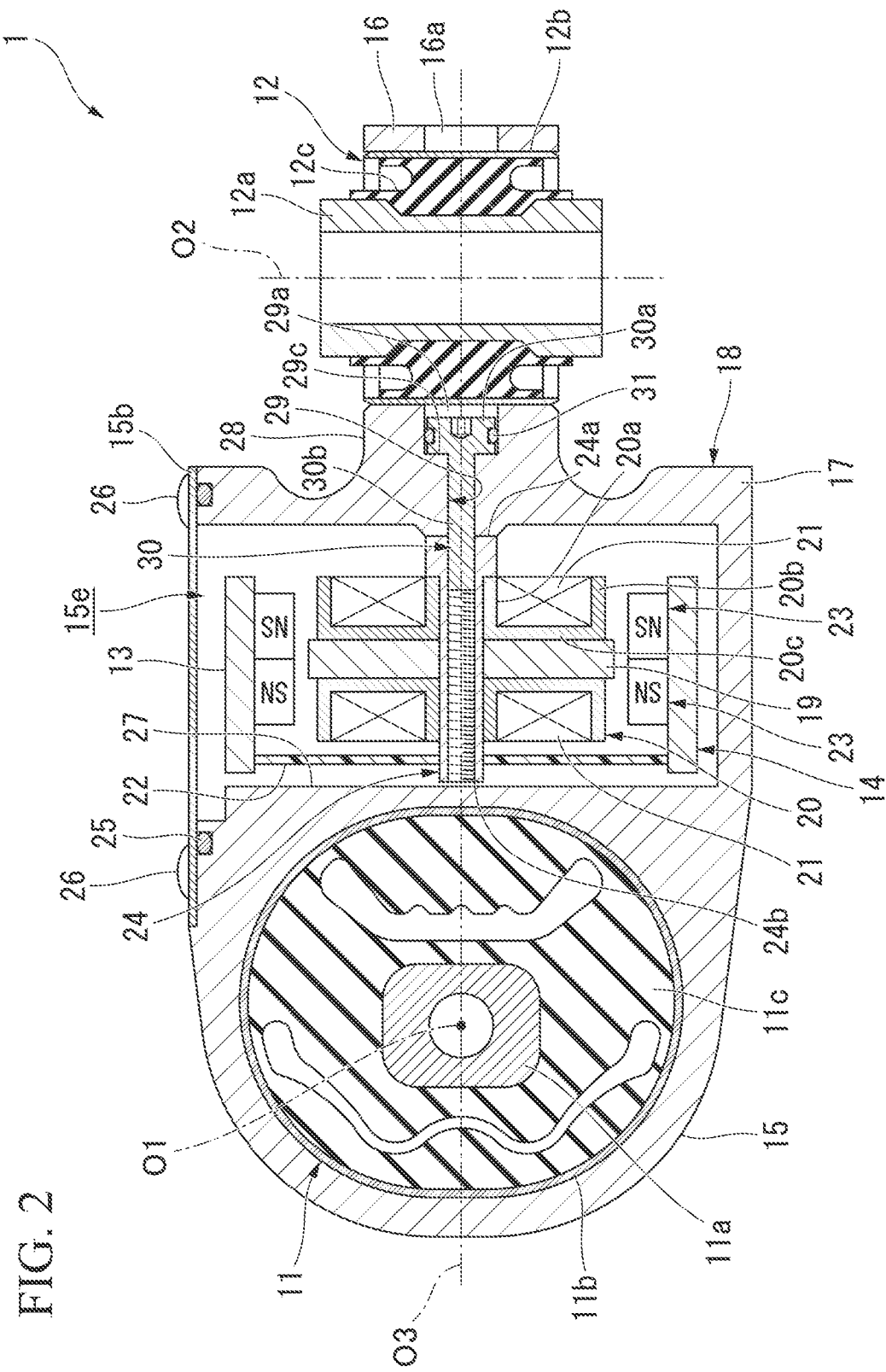
FIG. 2 is a sectional view taken along an arrow line II-II of the torque rod in FIG. 1.

Hereinafter, an embodiment of a torque rod according to the present invention will be described with reference to FIGS. 1 and 2.

A torque rod 1 includes a first elastic bush 11 that is connected to a vibration generator such an engine, for example, a second elastic bush 12 that is connected to a vibration receiver such as a vehicle body, for example, and an actuator 14 that is installed between the first elastic bush 11 and the second elastic bush 12. The actuator 14 attenuates and absorbs an input vibration by causing a cylindrical movable element 13 to reciprocate so as to move close to or move away from the first elastic bush 11 and the second elastic bush 12 in response to the input vibration. The torque rod 1 further includes a case body 18 including a first accommodation portion 15 whose interior accommodates the first elastic bush 11, a second accommodation portion 16 whose interior accommodates the second elastic bush 12, and a third accommodation portion 17 whose interior accommodates the actuator 14.

The first elastic bush 11 and the second elastic bush 12 respectively include inner cylinders 11a and 12a, outer cylinders 11b and 12b which surround the inner cylinders 11a and 12a from the outside in a radial direction, and elastic bodies 11c and 12c which connect the inner cylinders 11a and 12a and the outer cylinders 11b and 12b to each other. For example, the inner cylinders 11a and 12a and the outer cylinders 11b and 12b are formed of a metal material or a resin material. For example, the elastic bodies 11c and 12c are formed of a rubber material.

The first elastic bush 11 is formed to have a diameter larger than that of the second elastic bush 12. In a shown example, an inner diameter and an outer diameter of the outer cylinder 11b of the first elastic bush 11 are larger than an outer diameter of the outer cylinder 12b of the second elastic bush 12. The elastic body 11c of the first elastic bush 11 has a volume larger than that of the elastic body 12c of the second elastic bush 12. A spring constant of the first elastic bush 11 is lower than a spring constant of the second elastic bush 12.

The first elastic bush 11 may be formed to have a diameter smaller than that of the second elastic bush 12. In addition, the volume of the elastic body 11c of the first elastic bush 11 may be smaller than the volume of the elastic body 12c of the second elastic bush 12. In addition, the spring constant of the first elastic bush 11 may be higher than the spring constant of the second elastic bush 12.

In the first elastic bush 11, the inner cylinder 11a, the outer cylinder 11b, and the elastic body 11c are respectively installed coaxially with a first center axis O1. In the second elastic bush 12, the inner cylinder 12a, the outer cylinder 12b, and the elastic body 12c are respectively installed coaxially with a second center axis O2.

The first center axis O1 extends in parallel along a virtual axis when the second center axis O2 is rotated as much as 90° around a connection axis O3 which connects the first center axis O1 and the second center axis O2 and which is orthogonal to both the first center axis O1 and the second center axis O2. That is, for example, in a case where the first center axis O1 is disposed so as to extend in a horizontal direction, the torque rod 1 is configured so that the second center axis O2 extends in a vertical direction. The movable element 13 is installed so as to be movable in a direction of the connection axis O3 (reciprocating direction) along the connection axis O3.

The actuator 14 includes a cylindrical movable element 13, a support shaft 24 extending in the direction of the connection axis O3 inside the movable element 13, an annular winding core 19 inserted into an outer peripheral surface of the support shaft 24, and two annular holders 20 inserted into the outer peripheral surface of the support shaft 24 and pinching the winding core 19 therebetween in the direction of the connection axis O3. The actuator 14 further includes a coil 21 held by each of the holders 20, a plurality of pairs of permanent magnets 23 installed on an inner peripheral surface of the movable element 13, and an elastic support body 22 which connects the movable element 13 and the support shaft 24 to each other. The movable element 13 surrounds the winding core 19 and the holder 20 over an entire periphery around the connection axis O3.

The holder 20 includes an inner cylinder 20a inserted into the outer peripheral surface of the support shaft 24, an outer cylinder 20b which surrounds the inner cylinder 20a, and a connection plate 20c which connects respective end portions on the winding core 19 side in the inner cylinder 20a and the outer cylinder 20b to each other.

The movable element 13 is installed inside the third accommodation portion 17, and can reciprocate so as to move close to any one and move away from the other one of the first elastic bush 11 and the second elastic bush 12. In the shown example, the movable element 13 is installed so as to be capable of reciprocating along the direction of the connection axis O3.

The pair of permanent magnets 23 is installed so that mutually opposite magnetic poles face each other across the connection axis O3. The plurality of pairs of permanent magnets 23 are installed to be continuous with each other along the direction of the connection axis O3. In the respective permanent magnets 23 adjacent to each other in this direction, the mutually opposite magnetic poles are adjacent to each other.

The elastic support body 22 is formed in an elastically deformable plate shape, and has a through-hole into which the support shaft 24 is fitted. The elastic support body 22 is connected to an end portion on the first elastic bush 11 side in the movable element 13.

The case body 18 includes the cylindrical first accommodation portion 15, the second accommodation portion 16, and the cylindrical third accommodation portion 17 in which the first end is closed and the second end is open. These first to third accommodation portions 15 to 17 are formed integrally with each other.

An inner peripheral surface of the first accommodation portion 15 is formed in a circular shape located coaxially with the first center axis O1, and an inner peripheral surface of the second accommodation portion 16 is formed in a circular shape located coaxially with the second center axis O2. The outer cylinder 11b of the first elastic bush 11 is fitted into the first accommodation portion 15, and the outer cylinder 12b of the second elastic bush 12 is fitted into the second accommodation portion 16. The inner diameter and the outer diameter of the first accommodation portion 15 are larger than the outer diameter of the second accommodation portion 16.

The third accommodation portion 17 is installed between the first accommodation portion 15 and the second accommodation portion 16, and is formed in a cylindrical shape extending parallel to the second center axis O2. The actuator 14 is accommodated inside the third accommodation portion 17, and the first end opening 15e of the third accommodation portion 17 is closed by a lid body 15b. The third accommodation portion 17 and the lid body 15b may be formed integrally with each other. In the shown example, an annular seal rubber 25 is installed between a peripheral edge portion of the first end opening 15e and the lid body 15b in the third accommodation portion 17. The lid body 15b is fixed to the third accommodation portion 17 by using a plurality of screws 26.

Then, according to the present embodiment, in the case body 18, any one of a partition wall (hereinafter, referred to as a first partition wall) 27 between an interior of the first accommodation portion 15 and an interior of the third accommodation portion 17, and a partition wall (hereinafter, referred to as a second partition wall) 28 between an interior of the second accommodation portion 16 and the interior of the third accommodation portion 17 has a communication hole 29 which allows the interiors of both the accommodation portions to communicate with each other. In addition, at the same time, the whole area of the other one of the partition wall 27 and the partition wall 28 is closed. The first partition wall 27 and the second partition wall 28 face each other in the direction of the connection axis O3.

In the shown example, the communication hole 29 is formed in the second partition wall 28. The communication hole 29 may be formed in the first partition wall 27. The communication hole 29 extends in the direction of the connection axis O 3. In addition, the communication hole 29 is disposed coaxially with the connection axis O3.

The second partition wall 28 is thicker in the direction of the connection axis O3 than the first partition wall 27. In the communication hole 29, a counterbore 29a having the inner diameter larger than that of other portions is formed in an end portion on a side opposite to the third accommodation portion 17. The counterbore 29a is open on an inner peripheral surface of the second accommodation portion 16. In the second accommodation portion 16, a through-hole 16a is formed in a portion facing the communication hole 29 across the second center axis O2. The inner diameter of the through-hole 16a is larger than the inner diameter of the counterbore 29a. The communication hole 29 is formed using a tool inserted into the second accommodation portion 16 from the through-hole 16a.

A bolt 30 is inserted into the communication hole 29. The bolt 30 is a hexagon socket head cap bolt including a head portion 30a and a shaft portion 30b, and the head portion 30a is accommodated inside the counterbore 29a.

A seal portion 31 which seals the third accommodation portion 17 is installed inside the counterbore 29a. In the shown example, the seal portion 31 is annularly formed of a rubber material, and is successively installed throughout an entire periphery between an outer peripheral surface of the head portion 30a and an inner peripheral surface of the counterbore 29a. A top surface of the head portion 30a on a side opposite to the shaft portion 30b is separated to the third accommodation portion 17 side from the inner peripheral surface of the second accommodation portion 16.

Here, the support shaft 24 of the actuator 14 is formed in a cylindrical shape, and is disposed coaxially with the connection axis O3. A female screw portion is formed on the inner peripheral surface of the support shaft 24. The shaft portion 30b of the bolt 30 is screwed into the support shaft 24.

The bolt 30 is screwed into the female screw portion of the support shaft 24. In this manner, the head portion 30a is pressed against an annular flat surface 29c facing a side opposite to the third accommodation portion 17 on the inner surface of the counterbore 29a, and the first end surface 24a of the support shaft 24 is pressed against the second partition wall 28. In the present embodiment, the second partition wall 28 is pinched in the direction of the connection axis O3 by the head portion 30a of the bolt 30 and the first end surface 24a of the support shaft 24.

Alternatively, a plurality of the female screw portions may be formed on the first end surface 24a of the support shaft 24, and a plurality of the communication holes 29 respectively communicating with the female screw portions may be formed in the second partition wall 28. A plurality of the bolts 30 may be screwed into the female screw portions through the communication holes 29. Therefore, the head portion 30a may be pressed against the annular flat surface 29c of the counterbore 29a, and the first end surface 24a of the support shaft 24 may be pressed against the second partition wall 28. In addition, alternatively, the female screw portion may be formed in the communication hole 29 formed in the second partition wall 28, and the bolt 30 may be screwed into the female screw portion. In this case, the support shaft 24 may be pushed toward the first accommodation portion 15 side by using the bolt 30. In this manner, the head portion 30a may be pressed against the annular flat surface 29c of the counterbore 29a, and the second end surface 24b of the support shaft 24 may be pressed against the first partition wall 27.

In a case of these modification examples, the female screw portion may not be formed in the support shaft 24, and the support shaft 24 may be formed to be solid.

In the support shaft 24, the first end surface 24a which comes into contact with the second partition wall 28 in the direction of the connection axis O3 has the outer diameter larger than that of other portions.

In the support shaft 24, the second end surface 24b on a side opposite to the first end surface 24a is not in contact with the closed first partition wall 27. In this manner, the second end surface 24b of the support shaft 24 and the first partition wall 27 are relatively movable in the direction of the connection axis O3.

For example, an elastic member such as a rubber material may be interposed between the second end surface 24b of the support shaft 24 and the first partition wall 27, and the elastic member may be pinched by the second end surface 24b of the support shaft 24 and the first partition wall 27 in the direction of the connection axis O. In addition, a recessed portion into which the second end portion of the support shaft 24 is inserted may be formed in the first partition wall 27, and the second end surface 24b of the support shaft 24 may not be in contact with the inner surface of the recessed portion. In this configuration, the elastic member may be installed inside the recessed portion, and the elastic member and the second end portion of the support shaft 24 may be brought into contact with each other.

In a state where the above-described torque rod 1 is installed in a vehicle so that a vibration is input in the direction of the connection axis O3, when the vibration having a frequency component which cannot be absorbed by the first elastic bush 11 is input, the torque rod 1 fulfills the following function. That is, in the torque rod 1, the movable element 13 is caused to reciprocate in the direction of the connection axis O3 in a phase opposite to the input vibration and with an amplitude and a frequency which are calculated by control means (not shown). In this manner, the input vibration is attenuated and absorbed. For example, the torque rod 1 may be installed in the vehicle so that the direction of the connection axis O3 coincides with a longitudinal direction of the vehicle.

As described above, according to the torque rod 1 in the present embodiment, the bolt 30 is screwed into the support shaft 24 or the communication hole 29. In this manner, the head portion 30a is pressed against the annular flat surface 29c of the counterbore 29a, and the first end surface 24a of the support shaft 24 is pressed against the second partition wall 28. Therefore, the movement of the bolt 30 toward the third accommodation portion 17 side along the direction of the connection axis O3 direction can be regulated, and the movement of the support shaft 24 toward the second accommodation portion 16 side along the direction of the connection axis O3 can be regulated. Accordingly, the bolt 30 and the support shaft 24 can be firmly fixed to the second partition wall 28.

According to the present embodiment, the second partition wall 28 is pinched in the direction of the connection axis O3 by the head portion 30a of the bolt 30 and the first end surface 24a of the support shaft 24. Therefore, the bolt 30 and the support shaft 24 can be more firmly fixed to the second partition wall 28.

In addition, the communication hole 29 is formed in only the second partition wall 28, and the first partition wall 27 is closed. Therefore, it is possible to easily and reliably ensure liquid-tightness inside the third accommodation portion 17.

In addition, the bolt 30 is screwed into the support shaft 24 or the communication hole 29. Accordingly, the bolt 30 does not need to reach the first partition wall 27. Therefore, it is possible to shorten the length of the bolt 30, and it is possible to suppress the inclination of the bolt 30 with respect to the second partition wall 28 and the support shaft 24.

In addition, the seal portion 31 which seals the interior of the third accommodation portion 17 is installed inside the counterbore 29a. Therefore, it is possible to prevent the seal portion 31 from interfering with the second elastic bush 12. In addition, the seal portion 31 is installed inside the counterbore 29a which has not only the inner peripheral surface but also the annular flat surface 29c. Therefore, a seal structure can be more freely designed, and high sealing performance can be easily realized.

In addition, in the support shaft 24, the first end surface 24a pressed against the second partition wall 28 has the outer diameter larger than that of other portions. Therefore, a large contact area between the first end surface 24a of the support shaft 24 and the second partition wall 28 is secured, and thus, it is possible to suppress an unstable state of the support shaft 24 inclined with respect to the second partition wall 28.

In addition, the second end surface 24b of the support shaft 24 is not in contact with the closed first partition wall 27. Therefore, for example, when a load in the direction of the connection axis O3 is applied to the torque rod 1 at the time of sudden acceleration or deceleration of the vehicle, or when the support shaft 24 is expanded and contracted as much as the different amount from the case body 18 due to a difference in thermal expansion coefficients, the load applied to the support shaft 24 can be suppressed by relatively moving the support shaft 24 and the case body 18 in the direction of the connection axis O3. In this manner, the load applied to the actuator 14 is suppressed. Therefore, it is possible to effectively prevent a vibration response of the actuator 14 from being degraded, and it is possible to improve durability of the torque rod 1.

In addition, the communication hole 29 is formed in the thick second partition wall 28 which is long in the direction of the connection axis O3 in the first partition wall 27 and the second partition wall 28. Therefore, a structure of the seal portion 31 which seals the third accommodation portion 17 can be more freely designed.

In addition, the first elastic bush 11 having a large size is connected to the vibration generator, and the second elastic bush 12 having a small size is connected to the vibration receiver. In this manner, the first elastic bush 11 attenuates and absorbs a lot of the input vibration transmitted from the vibration generator. Therefore, specifications of the actuator 14 can be minimized as much as possible, and an increase in the cost of the torque rod 1 can be suppressed.

In addition, the bolt 30 which fixes the actuator 14 to the interior of the third accommodation portion 17 is installed in the second partition wall 28 which is far from the vibration generator side and is close to the vibration receiver side and which is less likely to be deformed in the first partition wall 27 and the second partition wall 28. Therefore, the actuator 14 is affected by a fact that the second partition wall 28 is thick, and thus, the actuator 14 can be reliably fixed to the interior of the third accommodation portion 17 for a long period of time.

In addition, the communication hole 29 is formed in the second partition wall 28 continuous with the second accommodation portion 16 having the smaller outer diameter compared to the first accommodation portion 15 in the first partition wall 27 and the second partition wall 28. Therefore, it is possible to shorten the length of a tool for forming the communication hole 29 by inserting the tool from the outside of the case body 18, and it is possible to easily and accurately form the communication hole 29.

The technical scope of the present invention is not limited to the respective embodiments described above, and various modifications can be made within the scope of the present invention defined in the appended claims.

For example, in the above-described embodiment, as the seal portion 31 which seals the interior of the third accommodation portion 17, a configuration has been described in which the seal portion 31 is annularly formed of the rubber material and is installed over the entire periphery between the outer peripheral surface of the head portion 30a and the inner peripheral surface of the counterbore 29a. However, without being limited to this configuration, the present invention may be appropriately modified.

Alternatively, within the scope of the present invention defined by the appended claims, the configuration elements in the above-described embodiment can be appropriately replaced with well-known configuration elements. In addition, the above-described modification examples may be appropriately combined with each other.

INDUSTRIAL APPLICABILITY

According to this invention, it is possible to provide the torque rod capable of firmly fixing the support shaft of the actuator to the interior of the third accommodation portion and capable of easily and reliably ensuring the liquid-tightness inside the third accommodation portion.

REFERENCE SIGNS LIST

1 TORQUE ROD
11 FIRST ELASTIC BUSH
12 SECOND ELASTIC BUSH
13 MOVABLE ELEMENT
14 ACTUATOR
15 FIRST ACCOMMODATION PORTION
16 SECOND ACCOMMODATION PORTION
17 THIRD ACCOMMODATION PORTION
18 CASE BODY
24 SUPPORT SHAFT
24a FIRST END SURFACE
24b SECOND END SURFACE
27 FIRST PARTITION WALL (PARTITION WALL BETWEEN INTERIOR OF FIRST ACCOMMODATION PORTION AND INTERIOR OF THIRD ACCOMMODATION PORTION)
28 SECOND PARTITION WALL (PARTITION WALL BETWEEN INTERIOR OF SECOND ACCOMMODATION PORTION AND INTERIOR OF THIRD ACCOMMODATION PORTION)
29 COMMUNICATION HOLE
29a COUNTERBORE
29c ANNULAR FLAT SURFACE
30 BOLT
30a HEAD PORTION
31 SEAL PORTION

The invention claimed is:

1. A torque rod comprising:
   a first elastic bush connected to a vibration generator;
   a second elastic bush connected to a vibration receiver;
   an actuator installed between the first elastic bush and the second elastic bush, the actuator being configured to attenuate and absorb an input vibration by causing a cylindrical movable element to reciprocate so as to move close to or move away from the first elastic bush and the second elastic bush in response to the input vibration; and
   a case body including a first accommodation portion inside which the first elastic bush is accommodated, a second accommodation portion inside which the second elastic bush is accommodated, and a third accommodation portion installed between the first accommodation portion and the second accommodation portion and inside which the actuator is accommodated,
   wherein the actuator includes a support shaft extending along a reciprocating direction of the movable element inside the movable element,
   wherein in the case body, any one of a first partition wall between an interior of the first accommodation portion and an interior of the third accommodation portion and a second partition wall between an interior of the second accommodation portion and the interior of the third accommodation portion has a communication hole that allows the interiors of both the accommodation portions to communicate with each other, and a whole area of the other partition wall is closed,
   wherein in the communication hole, a counterbore is formed in an end portion on a side opposite to the third accommodation portion,
   wherein the torque rod further comprises a bolt that is inserted into the communication hole, and that has a head portion accommodated in the counterbore, and
   wherein the bolt is screwed into the support shaft or the communication hole, the head portion is pressed against an annular flat surface which faces a side opposite to the third accommodation portion on an inner surface of the counterbore, and the support shaft is pressed against the partition wall.

2. The torque rod according to claim 1,
   wherein a seal portion configured to seal the interior of the third accommodation portion is installed inside the counterbore.

3. The torque rod according to claim 2,
   wherein a first end surface of the support shaft pressed against the second partition wall in the reciprocating direction has a larger outer diameter than other portions.

4. The torque rod according to claim 3,
   wherein the bolt is screwed into the support shaft, and
   wherein the first end surface of the support shaft in the reciprocating direction is pressed against the second partition wall, and a second end surface on a side opposite to the first end surface is not in contact with the first partition wall which is closed.

5. The torque rod according to claim 4,
   wherein the second partition wall is installed between the interior of the second accommodation portion and the interior of the third accommodation portion.

6. The torque rod according to claim 3,
   wherein the second partition wall is installed between the interior of the second accommodation portion and the interior of the third accommodation portion.

7. The torque rod according to claim 2,
   wherein the bolt is screwed into the support shaft, and
   wherein a first end surface of the support shaft in the reciprocating direction is pressed against the second partition wall, and a second end surface on a side opposite to the first end surface is not in contact with the first partition wall which is closed.

8. The torque rod according to claim 7,
   wherein the second partition wall is installed between the interior of the second accommodation portion and the interior of the third accommodation portion.

9. The torque rod according to claim 2,
   wherein the second partition wall is installed between the interior of the second accommodation portion and the interior of the third accommodation portion.

10. The torque rod according to claim 1,
    wherein a first end surface of the support shaft pressed against the second partition wall in the reciprocating direction has a larger outer diameter than other portions.

11. The torque rod according to claim 10,
    wherein the bolt is screwed into the support shaft, and
    wherein the first end surface of the support shaft in the reciprocating direction is pressed against the second partition wall, and a second end surface on a side opposite to the first end surface is not in contact with the first partition wall which is closed.

12. The torque rod according to claim 11,
    wherein the second partition wall is installed between the interior of the second accommodation portion and the interior of the third accommodation portion.

13. The torque rod according to claim 10,
    wherein the second partition wall is installed between the interior of the second accommodation portion and the interior of the third accommodation portion.

14. The torque rod according to claim 1,
    wherein the bolt is screwed into the support shaft, and
    wherein a first end surface of the support shaft in the reciprocating direction is pressed against the second partition wall, and a second end surface on a side opposite to the first end surface is not in contact with the first partition wall which is closed.

15. The torque rod according to claim 14,
    wherein the second partition wall is installed between the interior of the second accommodation portion and the interior of the third accommodation portion.

16. The torque rod according to claim 1,
    wherein the second partition wall is installed between the interior of the second accommodation portion and the interior of the third accommodation portion.

* * * * *